United States Patent
Hendriks et al.

(10) Patent No.: US 7,130,258 B2
(45) Date of Patent: Oct. 31, 2006

(54) FIELD CURVATURE REDUCTION FOR OPTICAL SYSTEM

(75) Inventors: Bernardus Hendrikus Wilhelmus Hendriks, Eindhoven (NL); Jorrit Ernst De Vries, Eindhoven (NL); Teunis Willem Tukker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 224 days.

(21) Appl. No.: 10/497,431

(22) PCT Filed: Dec. 5, 2002

(86) PCT No.: PCT/IB02/05207

§ 371 (c)(1),
(2), (4) Date: Jun. 2, 2004

(87) PCT Pub. No.: WO03/049094

PCT Pub. Date: Jun. 12, 2003

(65) Prior Publication Data

US 2005/0041559 A1    Feb. 24, 2005

(30) Foreign Application Priority Data

Dec. 7, 2001  (EP)  ................... 01204750

(51) Int. Cl.
*G11B 7/00* (2006.01)

(52) U.S. Cl. .............. 369/112.01; 369/103; 369/112.03

(58) Field of Classification Search ................ 369/103, 369/112.1, 112.01, 112.26, 112.05, 112.07, 369/44.23, 44.24, 112.03
See application file for complete search history.

(56) References Cited

U.S. PATENT DOCUMENTS 6,947,368 B1 *  9/2005  Hendriks et al. ...... 369/112.26

* cited by examiner

*Primary Examiner*—Nabil Hindi
(74) *Attorney, Agent, or Firm*—Michael E. Belk

(57) ABSTRACT

An optical head (1) for scanning an optical record carrier (2) is provided with a compensator (16) for compensating the field curvature aberration of the objective system (18) caused by operation of the optical head at a different field angles. A surface of the compensator (16) comprises a phase structure in the form of annular areas (52, 53, 54, 55, 56), the areas forming a non-periodic pattern of optical paths of different lengths. The optical paths change as a function of field angle and form a field angle-dependent wavefront deviation that compensates field curvature of the optical head.

19 Claims, 3 Drawing Sheets

FIELD CURVATURE REDUCTION FOR OPTICAL SYSTEM

The invention relates to an optical head for scanning an optical record carrier having an information layer, the head comprising a radiation source for generating a radiation beam, an optical system for converging the radiation beam to a focus on the information layer, the optical system imparting a field angle-dependent first wavefront deviation to the radiation beam, and a compensator arranged in the radiation beam for compensating the first wavefront deviation. The invention also relates to an optical device comprising an optical system and a compensator, the optical system imparting a field angle-dependent first wavefront deviation to a radiation beam passing through the optical device, the compensator being arranged for compensating the first wavefront deviation.

A multi-track optical head scans several tracks on the information layer of an optical record carrier simultaneously. This is achieved by focussing a number of beams with different field angles to a same number of spots on the information layer by means of an optical system, where each spot scans a track. When the optical system exhibits field curvature wavefront aberration, not all spots will be simultaneously in focus on the information layer, resulting in a deterioration of the read out signals of the tracks for which the spot is not correctly in focus. When the optical system consists of a single lens, the field curvature is to lowest order proportional to $$(c_1 - c_2)\left(\frac{1}{n} - 1\right) \quad (1)$$

with $c_1$ the curvature of the first surface of the lens, $c_2$ the curvature of the second surface of the lens and n the refractive index of the material of the lens. In order to have no field curvature, the radii of the lens surfaces must be the same, which is in general not practical. This means that resort has to be made to other methods to reduce the field curvature of the objective lens.

Not only for optical recording but also for other areas of optical design such as photography lenses, motion picture projection objectives, lenses for microlithography, field curvature is a dominating aberration which must be corrected for good performance of the lens.

A method to compensate field curvature of a lens is to add an additional negative lens, called "field flattener" (see for instance W. J. Smith, Modern optical engineering, (McGraw-Hill, New York) chapter 13). The field flattener has to be positioned near the focal plane of the lens in order to keep the power contribution of the field flattener to the system low. Although it results in a significant reduced field curvature, a drawback of positioning the element close to the focal plane is that it becomes sensitive to dust and other contamination. For optical recording such a solution is not practical because of the thickness of the cover layer of the disk. As a result, the field flattener is at least at a distance equal to the thickness of the cover layer of the disk away from the focal plane, which significantly reduces the action of the field flattener.

Another method to reduce field curvature has been proposed in an article published in Applied Optics vol. 32, (1993) pp. 60–66, where a staircase lens is used to correct field curvature. The staircase lens (or notched lens) can be considered as a combination of a refractive substrate and a blazed kinoform with zero combined power. Although such a blazed kinoform can be designed to yield 100% efficiency in one particular diffraction order, actual gratings never attain such high efficiency. This reduction of the efficiency of the light path of the optical head is disadvantageous in optical recorders, which require a large amount of radiation energy for writing information in the record carrier or reading the information from the record carrier at high speeds. Another drawback of these periodic grating structures is that they contain in general a large number of zones, making them difficult to manufacture.

It is an object of the invention to provide an optical head in which the effect of field curvature is reduced without the above mentioned disadvantages.

This object is achieved if, according to the invention, the compensator includes a phase structure of a material having field angle-dependent properties, the phase structure having the form of annular areas forming a non-periodic pattern of optical paths of different, field angle-dependent lengths, the optical paths forming a second wavefront deviation compensating the field angle-dependent first wavefront deviation. If the material of the phase structure and the optical paths of the annular areas are properly chosen, the phase structure of the annular areas introduce a wavefront deviation in the radiation beam having the correct shape and field angle dependence to compensate the wavefront deviation of the optical system. The compensation may be total or partial. The phase structure does not impose restrictions on the elements of the optical system, thereby leaving a great freedom of design. Another aspect related to this freedom is that the annular areas forming the non-periodic pattern can be made relatively wide, which improves the manufacturability significantly at the expense of less perfect but still sufficient compensation of the wavefront deviation. The manufacturability will be further improved if the optical paths of neighbouring areas differ by more than one wavelength. A further advantage of the invention is that the compensator can be designed to have no optical power. As a result, the compensator can be placed anywhere in the lens system, contrary to the conventional field flattener, which must be placed close to the focal plane.

It should be noted, that the phase structure according to the invention has a non-periodic pattern, and, therefore, does not form diffraction orders. As a consequence, the non-periodic phase structure does not have the inherent losses of unused diffraction orders of a grating. The compensator is therefore very suitable for use in an optical head that requires a change in wavefront in dependence on the field angle, because the phase structure can introduce the required field angle-dependent wavefront changes without appreciable loss of radiation energy.

In a preferred embodiment the optical head includes an objective system imparting field curvature aberration as the first wavefront deviation to the radiation beam. When the wavefront incident on the compensator has a radius of curvature different from the radius of curvature of the surface of the compensator, the compensator can be designed to compensate not only field curvature but also coma wavefront aberration.

Preferably, the non-periodic phase structure compensates at least 50% of the root mean square (rms) field curvature wavefront error at a certain field angle with respect to the direction of an optical axis of the optical system and caused by the objective. More preferably, the compensation is at least 70%.

Preferably, the rms wavefront error caused by the field curvature generated by the objective lens at a maximum required field angle with respect to the axial direction and compensated by the non-periodic phase structure is less than 40 mλ. More preferably, the wavefront error is less than 20 mλ.

Another aspect of the invention relates to a scanning device for scanning an optical record carrier having an information layer, the device including an optical head according to the invention.

A further aspect of the invention relates to an optical device including an optical system and a compensator, the optical system imparting a field angle-dependent first wavefront deviation to a radiation beam passing through the optical system, the compensator being arranged in the path of the radiation beam for compensating the first wavefront deviation, in which the compensator comprises a phase structure having field angle-dependent properties, the phase structure having the form of annular areas forming a non-periodic pattern of optical paths of different, field angle-dependent lengths, the optical paths forming a second wavefront deviation compensating the field angle-dependent first wavefront deviation. The optical system is preferably an objective system. The optical system may be a refractive and/or a diffractive and/or a reflective system.

In a preferred embodiment of the optical device the differences between the optical paths at zero field angle are multiples of the first wavelength. In that case the phase structure will not affect the radiation beam at zero field angle, whereas it will introduce a wavefront deviation in the radiation beam at non-zero field angles.

Other optical functions can be integrated in the optical system by arranging a grating on one of the surfaces of an element in the optical system. The grating can be used to make the optical system achromatic or to make a DVD objective compatible for scanning record carriers of the CD type.

Other optical functions can be integrated in the compensator by arranging a grating on one of the surfaces of the optical element. The grating can be used to make the lens system achromatic or to make a DVD objective compatible for scanning record carriers of the CD type.

In a special embodiment of the optical set, the wavefront deviation is field curvature.

The objects, advantages and features of the invention will be apparent from the following more particular description of preferred embodiments of the invention, as illustrated in the accompanying drawings, in which FIG. 1 shows a scanning device according to the invention;

Figure 1:
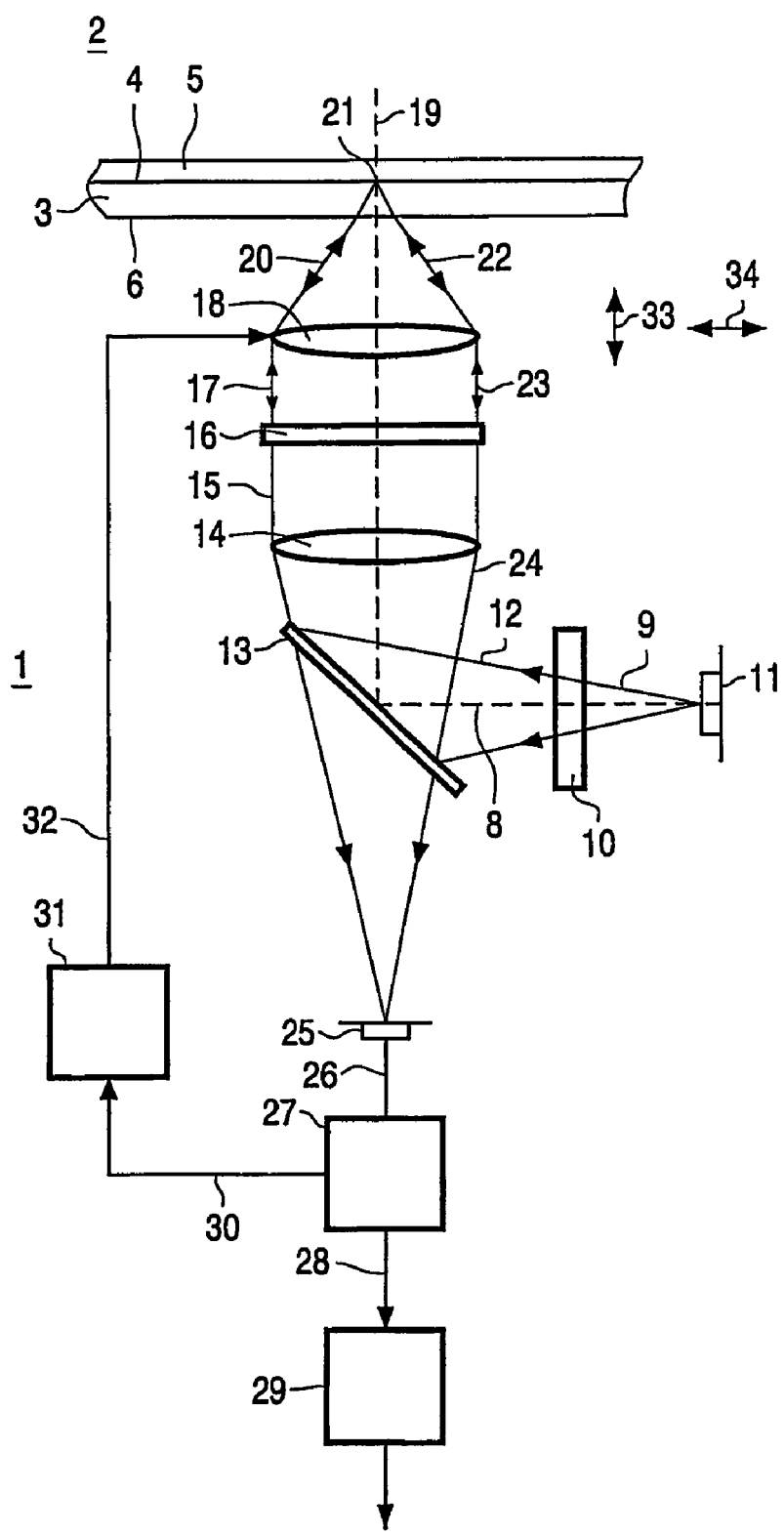

FIG. 1 shows a device 1 for scanning an optical record carrier 2. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer. Alternatively, the transparent layer may have the sole function of protecting the information layer, while the mechanical support is provided by a layer on the other side of the information layer, for instance by the protection layer 5 or by a further information layer and a transparent layer connected to the information layer 4. Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetization different from their surroundings, or a combination of these forms.

The scanning device 1 is of the so-called multi-track type and includes a radiation source 11 that can emit a radiation beam 9. The radiation source may be a semiconductor laser. A grating 10 diffracts the beam from the radiation source in seven different diffraction orders: −3, −2, −1, 0, 1, 2, 3, respectively, making different angles with the optical axis 8. In general, a radiation beam in the following includes the seven diffraction subbeams. A beam splitter 13 reflects the diverging radiation beam 12, towards a collimator lens 14, which converts the diverging beam 12 into a collimated beam 15. The collimated beam 15 is incident on a transparent compensator 16, which modifies the wavefront of the collimated beam in dependence on the field angle of each of the seven subbeams in the scanning device. The beam 17 coming from the compensator 16 is incident on an objective system 18. The objective system may comprise one or more lenses and/or a grating. The objective system 18 has an optical axis 19. The objective system 18 changes the beam 17 to a converging beam 20, incident on the entrance face 6 of the record carrier 2. The objective system has a spherical aberration correction adapted for passage of the radiation beam through the thickness of the transparent layer 3. The converging beam 20 forms seven different spots 21 on the information layer 4, each focussing on different neighbouring or close spiral tracks. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation of the seven sub beams separately and converts it into electrical output signals 26. Elements 10, 11, 13, 14, 16, 18 and 25 form an optical head in the scanning device. Elements 16 and 18 form a lens system having a reduced field curvature.

A signal processor 27 converts these output signals to various other signals. One set of the signals is a set of information signals 28, the values of which represents information read by each of the seven subbeams from the information layer 4. The information signals are processed by an information processing unit for error correction 29. Other signals from the signal processor 27 are the focus error signal and radial error signal 30 which are retrieved from the central or zero-order subbeam. The focus error signal represents the axial difference in height between the spot 21 and the information layer 4. The radial error signal represents the distance in the plane of the information layer 4 between the spot 21 and the centre of a track in the information layer to be followed by the spot. The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that the spot of the central subbeam coincides substantially with the plane of the information layer 4. The radial actuator controls the position of the objective lens 18 in a radial direction 34, thereby controlling the radial position of the spot 21 such that the spot of the central sub beam coincides substantially with the central line of track to be followed in the information layer 4. The tracks in the Figure run in a direction perpendicular to the plane of the Figure. Since the central subbeam is in focus with the information layer, the other sub beams may be out of focus when the lens system exhibits field curvature, significantly deteriorating the signal quality obtained from these subbeams.

The device of FIG. 1 may be adapted to scan also a second type of record carrier having a thicker transparent layer than the record carrier 2. The device may use the radiation beam 12 or a radiation beam having a different wavelength for scanning the record carrier of the second type. The NA of this radiation beam may be adapted to the type of record carrier. The spherical aberration compensation of the objective system must be adapted accordingly.

The objective system 18 shown in the embodiment of FIG. 1 is a single lens having an NA of 0.6 for operation at a wavelength of 650 nm. The entrance pupil diameter is 3.3 mm. The lens has one aspherical and one planar surface. The aspherical surface is made by applying a thin acrylic layer on a surface of a glass lens body. The lens has a thickness on the optical axis of 1.922 mm. The lens body is made of SFL56 Schott glass with refractive index n=1.7767. The convex surface of the lens body which is directed towards the collimator lens has radius of 2.32 mm. The acrylic layer has refractive index of n=1.5646. The thickness of this layer on the optical axis is 22 μm. The rotational symmetric shape of the aspherical surface can be described by the equation $$z(r) = B_2 r^2 + B_4 r^4 + B_6 r^6 + \ldots$$

with z being the position of the surface in the direction of the optical axis in millimetres, r the radial distance to the optical axis in millimetres, and $B_k$ the coefficient of the k-th power of r. The values of $B_2$ to $B_{10}$ for the surface of the objective lens facing the radiation source are 0.24137393, 0.0046535966, −0.00014987079, −4.0957635 $10^{-5}$, −8.3283927 $10^{-6}$, respectively. The distance between the objective lens and the disk is 1.290 mm. The cover layer of the disk is 0.6 mm thick and is made of polycarbonate with refractive index n=1.5803. The subbeam corresponding to the third order diffraction beam of the seven-spots grating has a field angle of 0.73 degrees on the objective lens. Due to the field curvature of the objective lens this subbeam will focus 0.42 μm before the information layer. Since this defocus aberration of the outer beam can not be compensated for by the actuator without affecting the central beam, the field curvature aberration will reduce the quality of the focal spot 21 of the other then central subbeams. The compensator 16 is adapted to compensate the field angle-dependent aberration of the objective lens.

Figure 2:
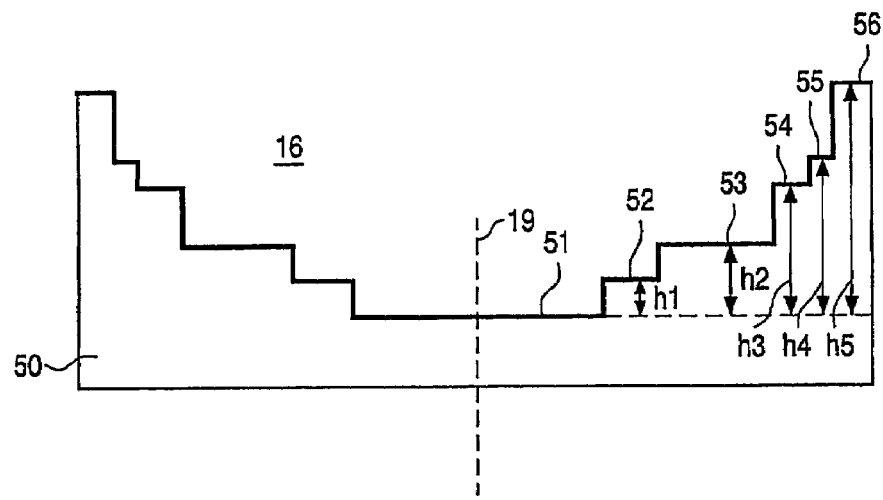
FIG. 2 shows a cross-section of the compensator.

FIG. 2 shows a schematic cross-section of the compensator 16. The compensator comprises a transparent plate 50, one surface of which is a phase structure, which is rotationally symmetric around the optical axis 19. The phase structure has a central area 51 and five concentric annular areas 52, 53, 54, 55 and 56. The annular areas 52, 53, 54, 55 and 56 are rings with a height of $h_1$, $h_2$, $h_3$, $h_4$ and $h_5$ above the height of the central area 51. The height of the areas is exaggerated with respect to the thickness and radial extent of the plate 50. The rings are made of a material having a refractive n. The plate 50 may also be made of the same material as the rings.

The heights $h_j$ are each equal to $m_j h$, with $m_j$ an integer and h equal to $$h = \frac{\lambda}{n-1} \quad (2)$$

where λ is the wavelength and n is the refractive index of the material of the rings at the wavelength. In this particular example the compensator is made of the material COC with refractive index n=5312. As a result, the height h is equal to 1.224 μm. Since each of the annular areas with height $h_j$ introduces a phase change of ($m_j$ 2π) radians in the radiation beam at the zero field angle, the phase structure does not change the wavefront of the radiation beam at this angle. When the incident beam enters the structure at a field angle θ, the height $h_j$ no longer introduces a phase change of ($m_j$ 2π). The difference phase ΔΦ$_j$ introduced by ring j into the radiation beam is equal to $$\Delta\Phi_j = 2\pi m_j \left[ \frac{1}{n-1} \left( n\sqrt{1 - \frac{\sin^2\theta}{n^2}} - \cos\theta \right) - 1 \right] \quad (3)$$

Figure 3:
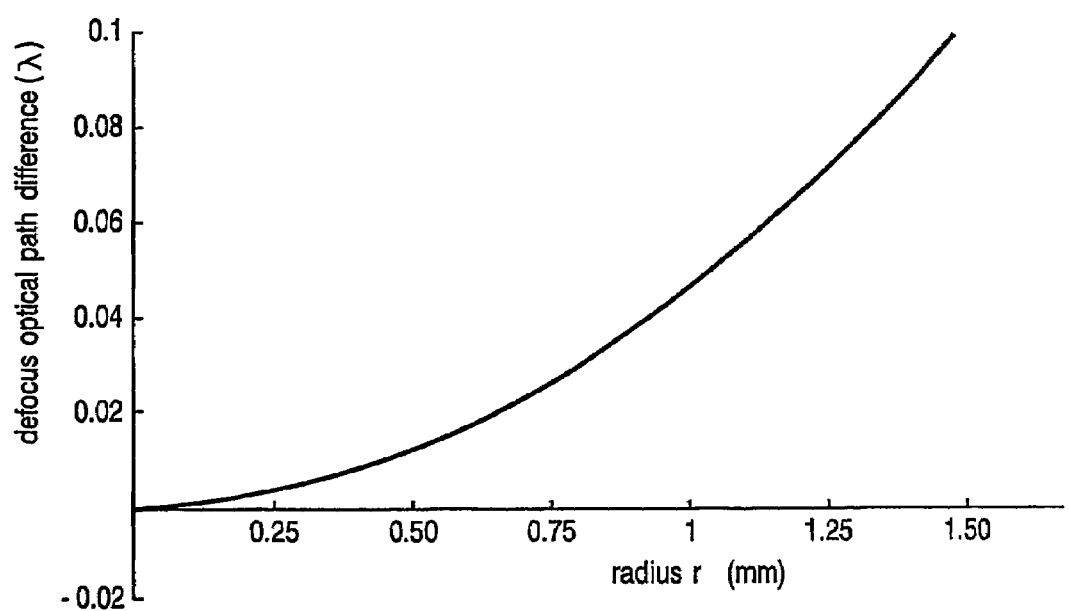
FIG. 3 shows the wavefront aberration of the objective lens at an elevated field angle.

For small field angles θ this equation can be simplified to $$\Delta\Phi_j = \frac{\pi m_j}{n} \theta^2 \quad (4)$$

with the field angle θ expressed in radians. Consequently, when the beam enters the compensator with a non-zero field angle θ, the compensator gives rise to a stepped wavefront deviation. By proper design of the zone widths and heights the non-periodic phase structure can compensate the field curvature of the objective, which is proportional to $θ^2$. If the beam enters the optical head at an field angle 0.73 degrees (12.74 mrad), the objective lens introduces 37.5 mλ RMS field angle-induced defocus due to the field curvature aberration. FIG. 3 shows a cross-section of the defocus contribution to the wavefront W as a function of the radius r of the radiation beam. The phase change ΔΦ$_j$ introduced by ring j of height $m_j h$ of the non-periodic phase structure at 12.74 mrad field angle is now 0.000333 $m_j$ radians. The values of the integers $m_j$ for each of the rings in the phase structure must be chosen such that the phase structure will introduce a wavefront deviation that approximates the defocus contribution to the wavefront due to the field curvature as shown in FIG. 3 but with opposite sign. Table I shows the results of the optimisation by the radii of the four annular areas shown in FIG. 2, the height of each area and the relative phase of the radiation beam after passage through each area for 12.74 mrad field angle.

TABLE I

| begin area (mm) | end area (mm) | height $m_j$*h (μm) | $m_j$ | ΔΦ$_j$(θ = 12.74 mrad) (radians) |
| --- | --- | --- | --- | --- |
| 0.0 | 0.2 | 0 | 0 | 0 |
| 0.2 | 0.5 | 115.06 | 94 | 0.0312 |
| 0.5 | 0.8 | 358.63 | 293 | 0.0976 |
| 0.8 | 1.1 | 779.69 | 637 | 0.2121 |
| 1.1 | 1.4 | 1527.55 | 1248 | 0.4155 |
| 1.4 | 1.65 | 2476.15 | 2023 | 0.6737 |

Figure 4:
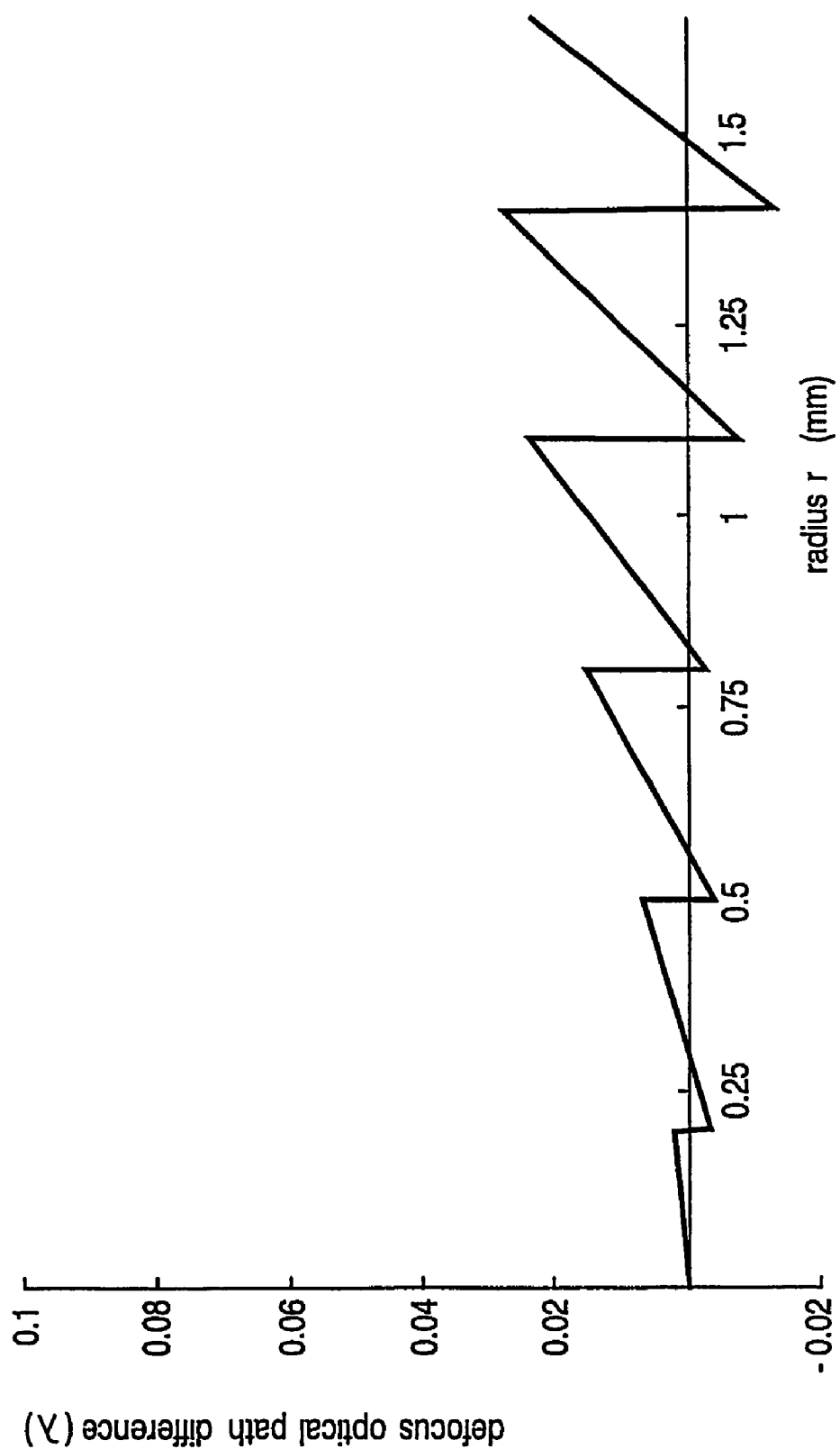
FIG. 4 shows the wavefront aberration of the combination of the objective lens and the compensator at the elevated field angle.

FIG. 4 shows the defocus wavefront error at θ=12.74 mrad when both the objective lens and the compensator are arranged in the radiation beam. The wavefront error is now 9.3 mλ. Consequently, the compensator reduces the field curvature wavefront aberration of the objective lens caused by the change in field angle from a defocus wavefront error of 37.5 mλ to 9.3 mλ, hence a reduction by a factor of four. Although only the reduction for one value of the field angle has been shown, the reduction factor of approximately four will also hold for a whole range of field angles around the zero field angle used in this embodiment, because both the field curvature wavefront deviation introduced by the objective lens and by the compensator are quadratically proportional to the field angle.

Table I shows that the step height distribution is clearly non-periodic. Furthermore, by letting the difference between subsequent values of $m_j$ be larger than one, the annular areas can be made wide and as a result the number of annular areas can be small (in this embodiment six), which makes the structure easier to manufacture. As a result of the limited number of annular areas the compensation of the field angle effect is not perfect, as can be seen in FIG. 4, which shows the wavefront aberration remaining after compensation. Increasing the number of annular areas results in a lower rest wavefront aberration but also in a more difficult to make structure. An advantage of making the structure non-periodic is that the designer can balance between complexity of the structure versus the wavefront aberration remaining.

Furthermore, table I shows that the absolute value of the step heights are monotonously increasing as a function of the central radius of each zone. In the case the field curvature has opposite sign, hence the outer subbeams focus beyond the information layer, the values of $m_j$ become negative, but the absolute values of $m_j$ still are monotonously increasing as a function of the central radius of each zone. Another characteristic of the absolute value of the step heights is that they increase more than linearly as a function of the central radius of each zone. An improved operation of the phase structure is obtained if the wavefront of the incident central beam at the surface on which the non-periodic phase structure has a shape which is substantially the same as that of the surface. More specifically, if the wavefront is substantially spherical, the surface is preferably also substantially spherical; in other words, the radii of curvature of the wavefront and the surface should be substantially the same, preferably the difference is less than 20%. For example, when the phase structure is arranged on a flat surface, the incident beam should be substantially flat. When both radii are not substantially the same, the non-periodic phase structure will, apart from field curvature, also give rise to a comatic wavefront aberration as disclosed in European patent application 00304997.2 (PHNL000659 EP-P). Since the amount of coma introduced can be controlled by the difference in radii of curvature of the wavefront and the surface, the areas and heights of the non-periodic phase structure can be designed such, that both field curvature and coma introduced by an embodiment of the objective system 18 can be reduced by the compensator 16 for field angles different from zero.

Although the number of zones of the non-periodic phase structure is equal to six in the described embodiment, it may be any number. Preferably, the number of zones is larger than two in order to have sufficient compensation of the wavefront aberration. Preferably, the number is less than ten for reasons of manufacturability.

The compensator 16 and the objective system 18, shown in FIG. 1 as separate elements, may be integrated by arranging the phase structure 51 to 56 on a lens surface of the objective system. Preferably, the phase structure is arranged on an aspheric lens surface. The design of the compensator may be modified to compensate also any field curvature introduced by the collimator lens 14.

It is to be appreciated that numerous variations and modifications may be employed in relation to the embodiments described above, without departing from the scope of the invention which is defined in the appended claims. In the embodiment described a plurality of radiation beams at different field angles pass through the objective system simultaneously. The compensation may also be used in combination with objective systems in which a single beam passes through the objective system. The objective system is shown as a plano-convex lens; however other lens element types such as a convex-convex, convex-concave or concave-concave lenses may also be used. Whilst the objective system in the described embodiment is a single lens, it may be a compound lens containing two or more lens elements, either, or both, of which may include part of the non-periodic phase structure of the invention. The objective lens may for example comprise a refractive objective lens element and/or a diffractive lens element. The application of the non-periodic phase structure according to the invention is not limited to the field of optical recording. The phase structure may be used in any field of optics, e.g. photography, motion picture projection objectives and lenses for microlithography. In these areas field curvature is a dominating aberration which must be corrected for good performance of the lens.

Whilst in the above described embodiment a scanning device for scanning record carriers of the so-called DVD format is described, it is to be appreciated that the scanning device can be alternatively or additionally used for any other types of optical record carries to be scanned. It is also to be appreciated that radiation of other wavelengths than 650 nm suitable for scanning optical record carriers may be used.

The invention claimed is:

1. An optical head for scanning an optical record carrier having an information layer, the head comprising a radiation source for generating a radiation beam comprising a plurality of simultaneous diffraction subbeams, each of the plurality of simultaneous diffraction subbeams having a different angle of diffraction as compared to each other of the plurality of simultaneous diffraction subbeams, an optical system for simultaneously converging each of the plurality of simultaneous diffraction subbeams to a focus on corresponding portions of the information layer, the optical system imparting a field angle-dependent first wavefront deviation to the radiation beam, and a compensator arranged in the radiation beam for compensating the first wavefront deviation, wherein the compensator includes a phase structure of a material having field angle-dependent properties, the phase structure having the form of annular areas forming a non-periodic pattern of optical paths of different, field angle-dependent lengths, the optical paths forming a second wavefront deviation compensating the field angle-dependent first wavefront deviation, wherein the first wavefront deviation is field curvature.

2. Optical head according to claim 1, wherein said non-periodic phase structure compensates at least 50% of the root mean square (rms) field curvature wavefront error at a certain field angle with respect to the direction of an optical axis of the optical system and caused by the objective.

3. Optical head according to claim 1, wherein the rms wavefront error caused by the field curvature generated by the objective lens at a maximum required field angle with respect to the axial direction, and compensated by the non-periodic phase structure, is less than 40 mλ.

4. Optical head according to claim 1, wherein said non-periodic phase structure includes a plurality of annular zones, each of said zones comprising a step of a substantially constant height with respect to the shape of the surface of said objective lens on which the phase structure is arranged.

5. Optical head according to claim 1, wherein the differences between the optical paths are substantially multiples of the wavelength of the radiation beam for at least one field angle.

6. Optical head according to claim 4, wherein the radial widths of said zones are selected in dependence on the amount of field curvature to be compensated.

7. Optical head according to claim 6, wherein one of said zones (a) has a nonzero height $h_a$, measured in relation to said shape of the surface, located in the reason in which the normalized pupil coordinate $\rho$ ranges from 0.2 to 0.7.

8. Optical head according to claim 7, wherein a maximum radius of said zone has a normalized pupil coordinate $\rho$ smaller than 0.7.

9. Optical head according to claim 6, wherein one of said zones (b) has a nonzero height $h_b$, measured in relation to said shape of the surface, located in the region in which the normalized pupil coordinate $\rho$ ranges front 0.7 to 1.0.

10. Optical head according to claim 9, wherein the ratio of said height $h_b$ of zone (b) and height $h_a$ of zone (a) is greater than one.

11. Optical head according to claim 4, wherein the heights of said zones are selected substantially optimally in relation to the field curvature aberration to be compensated for.

12. Optical head according to claim 4, wherein the number of said zones is greater than four.

13. Optical head according to claim 4, wherein the number of said zones is less than ten.

14. A device for scanning an optical record carrier having an information layer, the device including an optical head according to claim 1.

15. Device according to claim 14, including an information processing unit for error correction.

16. An optical device comprising an optical system and a compensator, the optical system imparting a field angle-dependent first wavefront deviation to a radiator beam comprising a plurality of simultaneous diffraction subbeams, each of the plurality of simultaneous diffraction subbeams having a different angle of diffraction as compared to each other of the plurality of simultaneous diffraction subbeams and simultaneously passing through the system, the compensator being arranged in the path of the radiation beam for compensating the first wavefront deviation, wherein the compensator includes a phase structure of a material having field angle-dependent properties, the phase structure having the form of annular areas forming a non-periodic pattern of optical paths of different, field angle-dependent lengths, the optical paths forming a second wavefront deviation compensating the field angle-dependent first wavefront deviation, wherein the first wavefront deviation is field curvature.

17. Set of optical elements according to claim 16, wherein the differences between the optical paths are multiples of the wavelength of the radiation beam for at least one field angle.

18. Set of optical elements according to claim 16, wherein the optical element is a lens.

19. Set of optical elements according to claim 16, wherein the optical element and the compensator are integrated in a single element.

\* \* \* \* \*